United States Patent
Zhelyaskov et al.

(10) Patent No.: US 8,183,742 B2
(45) Date of Patent: May 22, 2012

(54) PIEZOELECTRIC ROTARY MOTOR WITH HIGH ROTATION SPEED AND BI-DIRECTIONAL OPERATION

(75) Inventors: Valentin R. Zhelyaskov, Sarasota, FL (US); Serhiy Petrenko, Kiev (UA)

(73) Assignee: Discovery Technology International, Inc., Sarasota, FL (US)

( * ) Notice: Subject to any disclaimer, the term of this patent is extended or adjusted under 35 U.S.C. 154(b) by 125 days.

(21) Appl. No.: 12/873,688

(22) Filed: Sep. 1, 2010

(65) Prior Publication Data

US 2011/0050038 A1 Mar. 3, 2011

Related U.S. Application Data

(60) Provisional application No. 61/238,768, filed on Sep. 1, 2009.

(51) Int. Cl.
H02N 2/12 (2006.01)

(52) U.S. Cl. ......... 310/323.02; 310/323.01; 310/323.04; 310/369

(58) Field of Classification Search .............. 310/323.01, 310/323.02, 323.04, 369
See application file for complete search history.

(56) References Cited

U.S. PATENT DOCUMENTS

| | | |
|---|---|---|
| 3,603,706 A | 9/1971 | Cermak et al. |
| 3,963,380 A | 6/1976 | Thomas, Jr. et al. |
| 4,344,743 A | 8/1982 | Bessman et al. |
| 4,352,636 A | 10/1982 | Patterson et al. |
| 4,453,103 A | 6/1984 | Vishnevsky et al. |
| 4,478,217 A | 10/1984 | Shimada et al. |
| 4,648,807 A | 3/1987 | Tippetts et al. |
| 4,909,212 A | 3/1990 | Minowa et al. |
| 4,959,580 A | 9/1990 | Vishnevsky et al. |
| 5,032,754 A * | 7/1991 | Iwao et al. ............... 310/323.02 |
| 5,036,944 A | 8/1991 | Danley et al. |
| 5,172,023 A | 12/1992 | Kawai et al. |

(Continued)

FOREIGN PATENT DOCUMENTS

JP 63089074 A 4/1988
(Continued)

OTHER PUBLICATIONS

Discovery Technology International, LLLP, et al., International Search Report mailed May 18, 2011; Application No. PCT/US2010/047494.

(Continued)

*Primary Examiner* — Walter Benson
*Assistant Examiner* — Bryan Gordon
(74) *Attorney, Agent, or Firm* — Fox Rothschild, LLP; Robert J. Sacco

(57) ABSTRACT

Piezoelectric motor that provides high speed and bi-directional operation. A first rotor is disposed about a first shaft, and a second rotor separate from the first rotor is disposed about the first shaft and a second shaft. Each of the rotors and shafts are centered on a common axis. An annular shaped first piezoelement is centered on the axis and fixed to the housing. First and second annular piezoelements are disposed within the first rotor, configured to motivate rotation of the second shaft in a first rotation direction when stimulated with a first exciter voltage. The third and fourth piezoelement are disposed within the second rotor, configured to motivate rotation of the second shaft in a second direction (opposed from the first direction) when stimulated with an exciter voltage.

23 Claims, 7 Drawing Sheets

U.S. PATENT DOCUMENTS

| | | | |
|---|---|---|---|
| 5,258,239 | A | 11/1993 | Kobayashi |
| 5,362,213 | A | 11/1994 | Komatsu et al. |
| 5,604,392 | A | 2/1997 | Vig |
| 5,726,518 | A | 3/1998 | Takagi |
| 5,839,467 | A | 11/1998 | Saaski et al. |
| 5,877,579 | A | 3/1999 | Zumeris |
| 6,116,257 | A | 9/2000 | Yokota et al. |
| 6,230,738 | B1 | 5/2001 | Watanabe et al. |
| 6,260,579 | B1 | 7/2001 | Yokota et al. |
| 6,467,350 | B1 | 10/2002 | Kaduchak et al. |
| 6,469,420 | B2 * | 10/2002 | Iarochenko et al. ..... 310/323.02 |
| 6,575,669 | B2 | 6/2003 | Takasan |
| 6,715,731 | B1 | 4/2004 | Post et al. |
| 6,964,327 | B2 | 11/2005 | Chang et al. |
| 7,095,160 | B2 | 8/2006 | Uchino et al. |
| 7,219,848 | B2 | 5/2007 | Sweeton |
| 7,395,607 | B1 | 7/2008 | Broderick et al. |
| 7,876,022 | B2 | 1/2011 | Petrenko et al. |
| 2001/0013740 | A1 | 8/2001 | Fukui et al. |
| 2001/0022485 | A1 | 9/2001 | Oda et al. |
| 2002/0017831 | A1 * | 2/2002 | Iarochenko et al. ..... 310/323.03 |
| 2002/0033651 | A1 | 3/2002 | Iarochenko et al. |
| 2004/0013740 | A1 | 1/2004 | Weickmann |
| 2004/0027032 | A1 | 2/2004 | Moteki et al. |
| 2004/0189150 | A1 | 9/2004 | Yamamoto et al. |
| 2004/0256956 | A1 | 12/2004 | Miyazawa |
| 2005/0012433 | A1 | 1/2005 | Brady et al. |
| 2005/0039990 | A1 * | 2/2005 | Girod et al. .................. 188/72.1 |
| 2005/0151107 | A1 | 7/2005 | Shu |
| 2005/0268921 | A1 | 12/2005 | Zumeris et al. |
| 2006/0006764 | A1 | 1/2006 | Ganor et al. |
| 2006/0244341 | A1 | 11/2006 | Uchino et al. |
| 2007/0119505 | A1 | 5/2007 | Petrenko |
| 2008/0252957 | A1 * | 10/2008 | Thibout et al. ................. 359/223 |
| 2009/0121586 | A1 * | 5/2009 | Kesil ........................ 310/323.02 |
| 2009/0212661 | A1 * | 8/2009 | Petrenko et al. ......... 310/323.02 |
| 2010/0148102 | A1 | 6/2010 | Petrenko et al. |
| 2010/0148630 | A1 | 6/2010 | Petrenko et al. |
| 2010/0150754 | A1 | 6/2010 | Petrenko et al. |
| 2010/0289362 | A1 | 11/2010 | Petrenko et al. |
| 2011/0050038 | A1 | 3/2011 | Zhelyaskov et al. |

FOREIGN PATENT DOCUMENTS

| | | | |
|---|---|---|---|
| JP | 10-117486 | A | 5/1998 |
| JP | 10-271854 | A | 10/1998 |
| JP | 11-252955 | | 9/1999 |
| JP | 2000-323763 | A | 11/2000 |
| JP | 2006-299889 | A | 11/2006 |
| KR | 2006-0097831 | A | 9/2006 |
| KR | 10-0728510 | B1 | 6/2007 |
| KR | 2009-0054728 | A | 6/2009 |
| SU | 1782316 | A3 | 12/1992 |
| SU | 1825435 | A3 | 6/1993 |
| UA | 4169 | | 2/1993 |
| WO | WO-2007-064310 | A1 | 6/2007 |
| WO | WO-2008057061 | A2 | 5/2008 |

OTHER PUBLICATIONS

International Search Report mailed Feb. 24, 2010; Application Serial No. PCT/US2009/068217 in the name of Discovery Technology International, LLP.

Leletty, R., et al., "Valves Based on Amplified Piezoelectric Actuators" [online], [retrieved on Jun. 20, 2011]. Retrieved from the Internet: http://www.cedrat.com/fileadmin/user_upload/cedrat_groupe/Publications/Publications/2002/06/Actuator2002_A4-6_VALVES-BASED-ON-AMPLIFIED-PIEZOELECTRIC-ACTUATORS.pdf.

A.S. Kasatkin. Fundamentals of electronics. Moskva. Energiya,1966, Ch. 8. p. 540.

Lindler, J.E., et al. "Piezoelectric Direct Drive Servovalve" CSA Engineering, Mountain View, CA., "Industrial and Commercial Applications of Smart Structures Technologies", San Diego, CA Mar. 2000.

International Search Report mailed Aug. 13, 2010; Application Serial No. PCT/US2009/068294 in the name of Discovery Technology International, LLP.

International Search Report mailed Sep. 28, 2010; Application Serial No. PCT/US2010/023470 in the name of Discovery Technology International, LLP.

Kasatkin, A. S. "Asynchronous Brushless Machines", Fundamentals of Electronics. Moscow Energy. 1966. Ch. 17, pp. 484-487.

Kasatkin, A.S. "Commutator Machines", Fundamentals of Electronics. Moscow Energy. 1966, Ch. 18, pp. 540-543.

Maleev, P. I. Gyroscopes with Electrical Suspension of Rotor, New Types of Gyroscopes, Leningrad, Sudostroenie, 1971, p. 9 and p. 31.

Information about Related Patents and Patent Applications, see section 6 of the accompanying Information Disclosure Statement Letter, which concerns Related Patents and Patent Applications, Oct. 10, 2011.

* cited by examiner

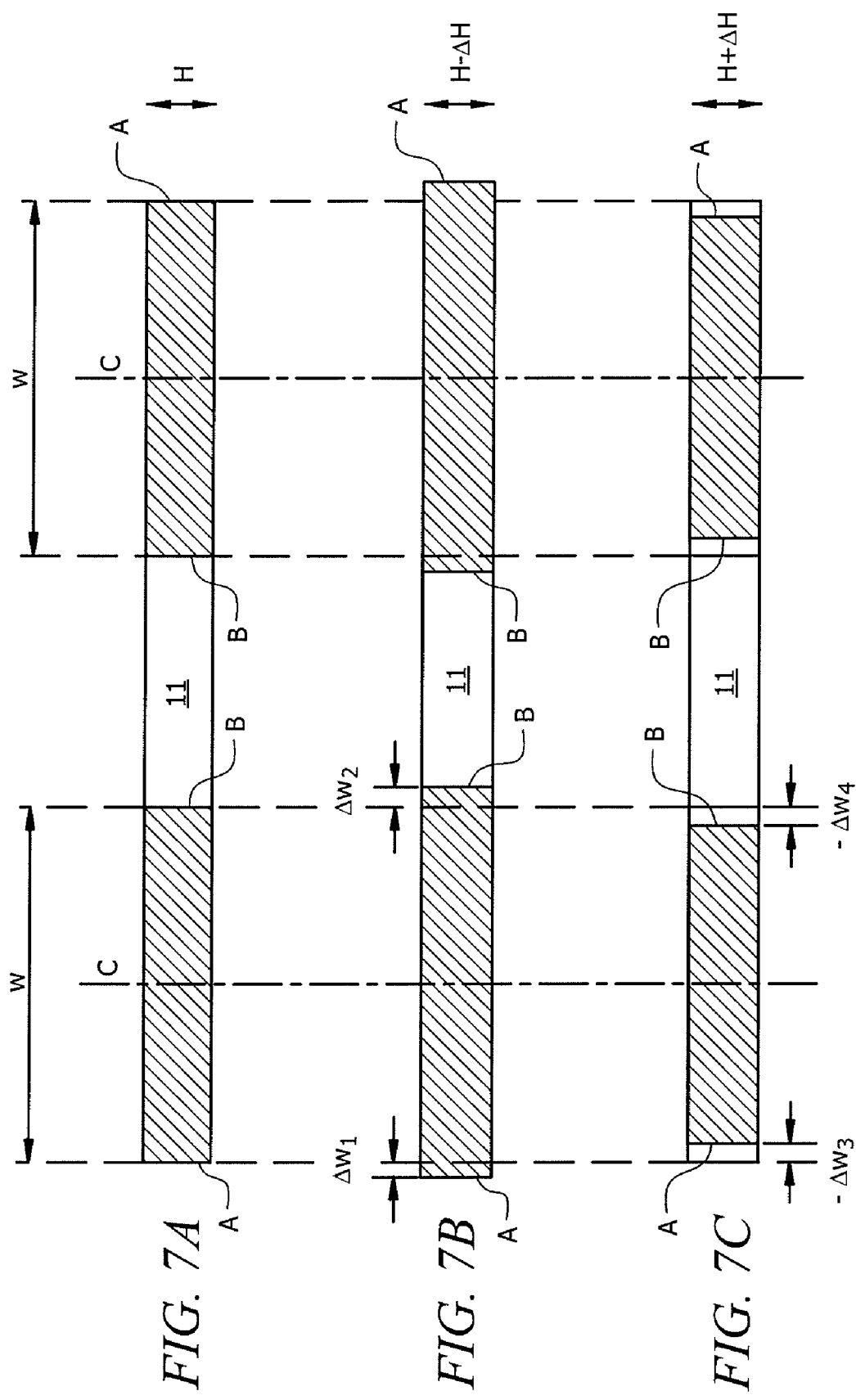

PIEZOELECTRIC ROTARY MOTOR WITH HIGH ROTATION SPEED AND BI-DIRECTIONAL OPERATION

CROSS REFERENCE TO RELATED APPLICATIONS

This application is a non-provisional application claiming the benefit of provisional U.S. Patent Application No. 61/238,768 filed on Sep. 1, 2009, the entirety of which is incorporated herein by reference.

BACKGROUND OF THE INVENTION

1. Statement of the Technical Field

The inventive arrangements relate to ultrasonic piezomotors, and more particularly to ultrasonic piezomotors having high rotational speed and torque.

2. Description of the Related Art

Ultrasonic piezomotors are well known in the art. Such motors work on the principal of excitation of ultrasonic standing wave(s) within a piezoelectric resonator. An ultrasonic piezomotor includes a piezoelectric ring resonator and pushers formed of metal or some other material. The pushers can be attached to the piezoresonator directly or through a wave shell. An ultrasonic radial standing wave is excited in the piezoelectric resonator causing the ring to expand and contract in radial direction, stimulating movement of the pushers along the radius. Such a device is commonly excited at the zero order radial mode of vibration of the annular piezoelement, which is considered most effective in terms of amplitude and the quality factor (Q factor) of the whole system.

Because of their elasticity, the pushers vibrate with the same frequency, although phase shifted, in a direction orthogonal to the radius of the ring. The superposition of the two orthogonal movements results in elliptical movements of the pushers. Because the pushers are held pressed against the rotor, their movement, via friction at the pusher contact area, causes rotation of the rotor.

Ultrasonic piezomotors as described herein offer unique properties of very high angular resolution and fast response. Such motors can also provide relatively high torque. However the maximum speed of rotation of a high-torque ultrasonic piezomotor is generally limited.

SUMMARY OF THE INVENTION

The current invention concerns a rotary piezoelectric motor. The motor includes a housing extending along an axis and a first shaft aligned with the axis and rotatably coupled to the housing. A first rotor disposed about the first shaft and configured for rotation about the first shaft. An annular shaped first piezoelement is disposed within the first rotor, centered on the axis and fixed to the housing. An annular shaped second piezoelement is disposed with the first rotor, centered on the axis and fixed to the first shaft. The first piezoelement is coupled to a plurality of pushers configured to rotate the first rotor at a first forward rate of rotation when the first piezoelement is stimulated with a first exciter voltage. Significantly, the second piezoelement is coupled to a plurality of pushers configured to engage the first rotor and rotate the first shaft in a second forward rate of rotation different than the first forward rate of rotation when the second piezoelement is stimulated with a second exciter voltage. In some embodiments, the first and second exciter voltages can be chosen to be the same.

According to one aspect of the invention, the second forward rate of rotation is greater than the first forward rate of rotation. For example, the second forward rate of rotation can be approximately twice the first forward rate of rotation.

The invention can also comprise a bi-directional rotary piezoelectric motor. For such a bi-directional motor, a second shaft can be provided separate from the first shaft, aligned with the axis and rotatably coupled to the housing. A second rotor separate from the first rotor is disposed about the first and second shafts such that the second rotor is configured for rotation about the first and second shaft. An annular shaped third piezoelement is disposed within the second rotor, centered on the axis and fixed to the first shaft. An annular shaped fourth piezoelement is disposed within the second rotor, centered on the axis and fixed to the second shaft.

A plurality of pushers are disposed on each of the third and fourth piezoelement. The pushers are configured to frictionally engage the second rotor in a clutch-like engagement when the third and fourth piezoelement are not excited, whereby the first and second shaft are rotationally locked with the second rotor. The plurality of pushers disposed on each of the first and second piezoelement are configured to frictionally engage the first rotor in a clutch-like engagement when the first and second piezoelement are not excited, whereby the third piezoelement is prevented from rotating.

The third piezoelement is coupled to a plurality of pushers configured to rotate the second rotor in a reverse direction opposite the forward direction when the third piezoelement is stimulated with a third exciter voltage. The third piezoelement is configured to rotate the second rotor at a first reverse rate of rotation. The fourth piezoelement is coupled to a plurality of pushers configured to engage the second rotor and rotate the second shaft in the reverse direction. The second shaft is rotated in the reverse direction at a second reverse rate of rotation different from the first rate of rotation when the fourth piezoelement is stimulated with a fourth exciter voltage. According to one aspect of the invention, the second reverse rate of rotation is greater than the first reverse rate of rotation. When the third and fourth exciter voltages are the same, the second reverse rate of rotation can be approximately twice the first reverse rate of rotation. According to another aspect of the invention, the first, second, third and fourth exciter voltages are the same.

The piezoelectric motor can also include a motor control system. The motor control system is configured to only apply the first and second exciter voltage to the first and second piezoelement when the motor is operated in a forward rotation mode. The motor control system can be configured to only apply the third and fourth exciter voltage to the third and fourth piezoelement when the motor is operated in a reverse rotation mode.

BRIEF DESCRIPTION OF THE DRAWINGS

Embodiments will be described with reference to the following drawing figures, in which like numerals represent like items throughout the figures, and in which:

FIG. 7A is a cross-section side view of the piezoelement in FIG. 5 in an unexcited state.

FIG. 7B is a cross-section side view of the piezoelectric element in FIG. 5 in an excited state resulting in radial expansion.

FIG. 7C is a cross-section side view of the piezoelement 11 in FIG. 5 in an excited state resulting in radial compression.

DETAILED DESCRIPTION

Figure 1:
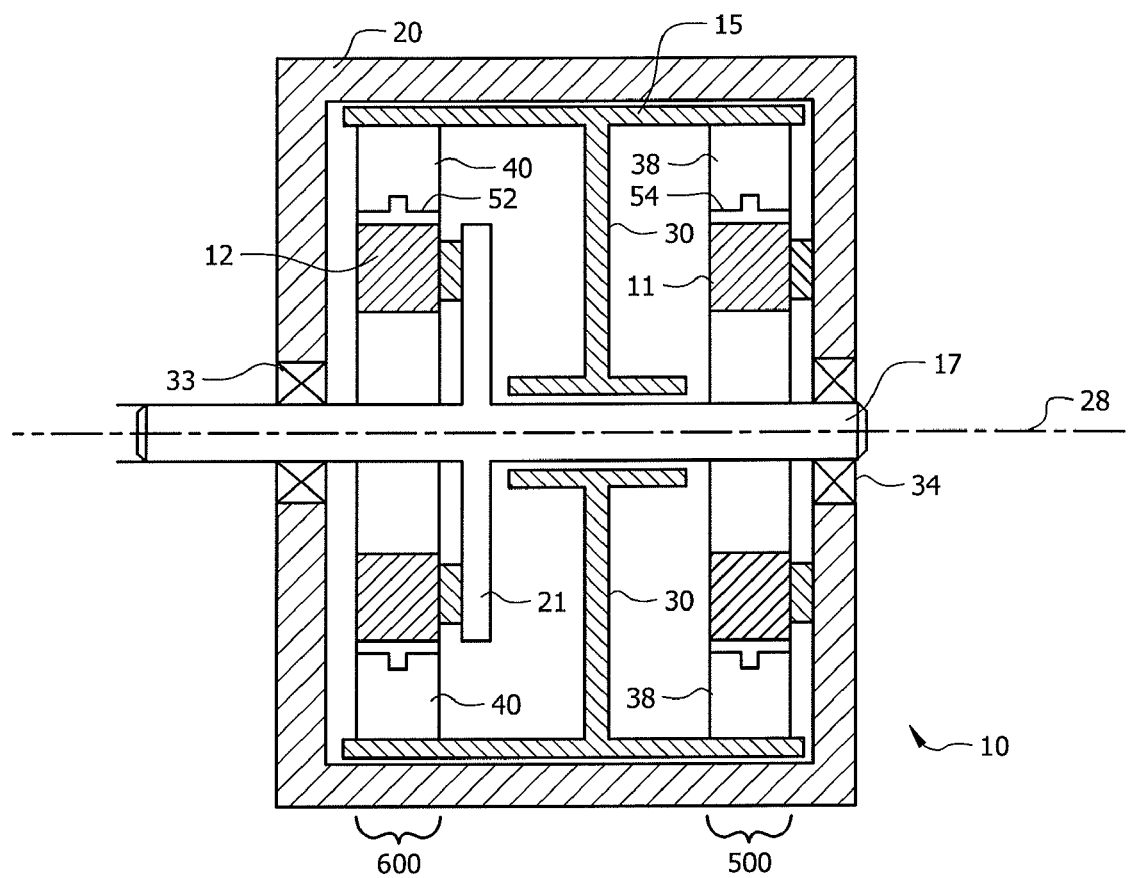
FIG. 1 is a cross-sectional view of a high speed piezoelectric rotary motor that is useful for understanding the invention.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Ultrasonic piezomotors are known to have unique properties of very high angular resolution and fast response. Such motors are also known to provide relatively high torque, given their typically small size and mass. However increasing the maximum speed of rotation of a high-torque ultrasonic piezomotor presents problems requiring design innovation. The current invention proposes an innovative solution using a proprietary advanced reversible (bidirectional) rotary piezoelectric motor employing four piezoresonators and a unique coupling system. Another benefit of the design is that of scalability enabling the fabrication of a wide range of motor sizes.

Briefly, the invention concerns a piezoelectric motor including a housing extending along an axis. A first shaft and a second shaft are provided, with the second shaft separate from the first shaft. The first and second shaft are each aligned with the axis and rotatably coupled to the housing. A first rotor is disposed about the first shaft, and a second rotor separate from the first rotor is disposed about the first and second shafts. Each of the first rotor and the second rotor are configured for rotation about at least one of the first and second shaft. An annular shaped first piezoelement is provided, centered on the axis and fixed to the housing. An annular shaped second piezoelement and third piezoelement are provided, each centered on the axis and fixed to the first shaft. An annular shaped fourth piezoelement is provided centered on the axis and fixed to the second shaft.

The first and second piezoelement are disposed within the first rotor, configured to motivate rotation of the second shaft in a first rotation direction when stimulated with a first exciter voltage. More particularly, the first piezoelement is coupled to a first plurality of pushers configured to rotate the first rotor at a first forward rate of rotation when the first piezoelement is stimulated with the first exciter voltage. The second piezoelement is coupled to a second plurality of pushers configured to engage the first rotor and rotate the first shaft in a second forward rate of rotation different than the first forward rate of rotation when the second piezoelement is stimulated with a second exciter voltage. As such, the second forward rate of rotation can be greater than the first forward rate of rotation. For example, the second forward rate of rotation in some embodiments is approximately twice the first forward rate of rotation. When the first and second piezoelement are not excited, the first and second plurality of pushers disposed on each of the first and second piezoelement are configured to frictionally engage the first rotor in a clutch-like engagement, whereby the third piezoelement is prevented from rotating.

The third and fourth piezoelement are disposed within the second rotor, configured to motivate rotation of the second shaft in a second direction (opposed from the first direction) when stimulated with an exciter voltage. More particularly, the third piezoelement is coupled to a plurality of pushers configured to rotate the second rotor in a reverse direction (opposite the forward direction) when the third piezoelement is stimulated with a third exciter voltage. The third piezoelement is configured to rotate the second rotor at a first reverse rate of rotation. The fourth piezoelement is coupled to a plurality of pushers configured to engage the second rotor and rotate the second shaft in the reverse direction at a second reverse rate of rotation different from the first reverse rate of rotation when the fourth piezoelement is stimulated with a fourth exciter voltage. When the third and fourth piezoelement are not excited, the plurality of pushers disposed on each of the third and fourth piezoelement are configured to frictionally engage the second rotor in a clutch-like engagement whereby the first and second shaft are rotationally locked with the second rotor.

Figure 2:
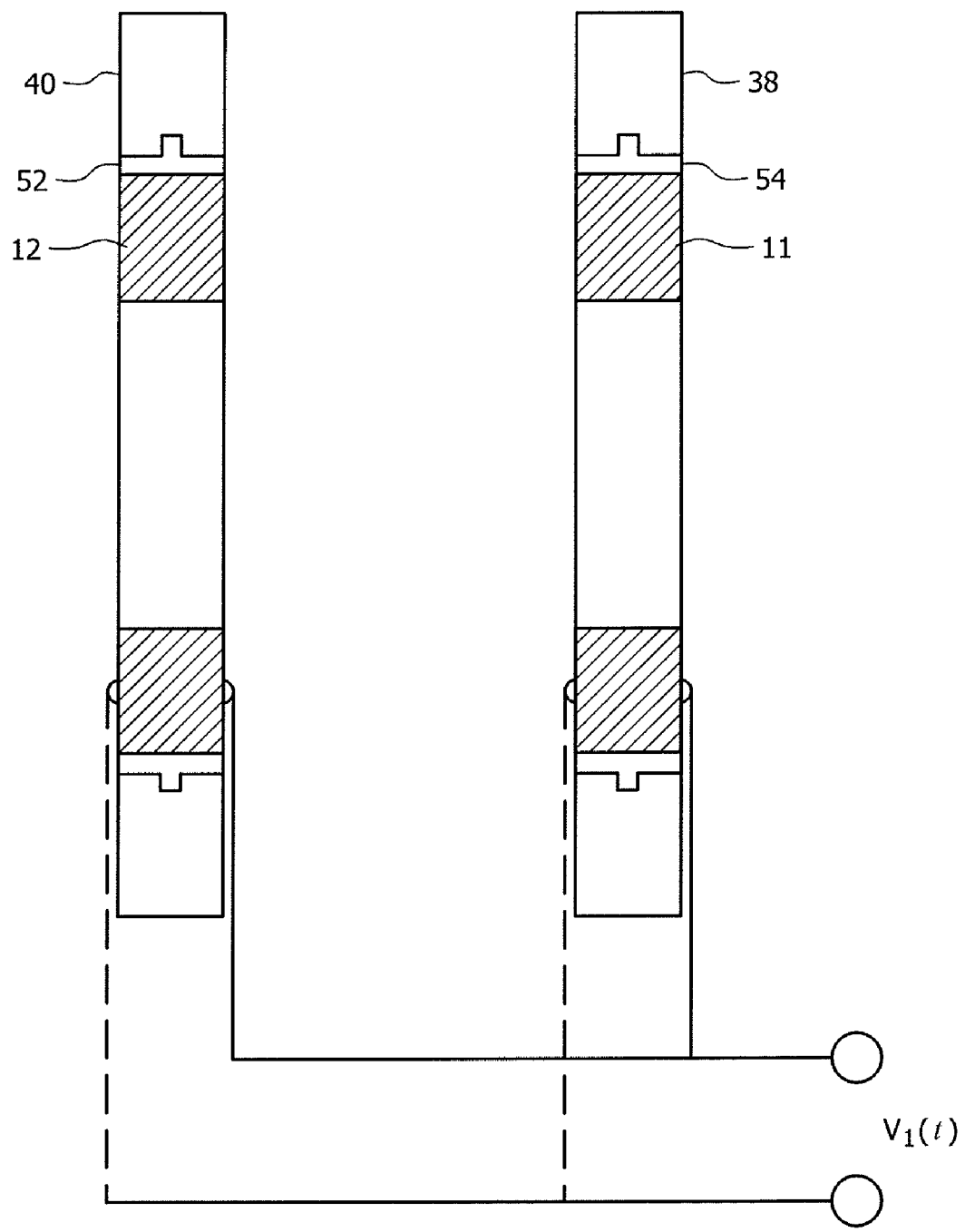
FIG. 2 is a schematic drawing that shows a basic electrical arrangement for excitation of the motor in FIG. 1.

Referring now to FIG. 1 there is shown a cross-sectional view of a high speed piezoelectric rotary motor 10 that is useful for understanding the invention. FIG. 2 illustrates the basic electrical arrangement for excitation of the motor in FIG. 1. The motor 10 is comprised of a housing 20 having a defined motor axis 28. A shaft 17 is provided aligned with the motor axis and rotatably mounted to the housing 20 using bearings 33, 34. A rotor 15 is disposed circumferentially about the shaft 17 along at least a portion of the length of the shaft.

Notably, the rotor 15 is configured for rotation relative to the housing 20, and relative to the shaft 17. In FIG. 1, mechanical support for this rotation is accomplished by means of annular support member 30 which is rotatably journaled on shaft 17. Still, the invention is not limited in this regard. For example, the rotor 15 could also rotate in bearings disposed between the housing 20 and the outer surface of the rotor 15.

The motor 10 is further comprised of two annular shaped piezoelectric oscillators which shall be referred to herein simply as piezoelements. The piezoelements include a first piezoelement 11 and second piezoelement 12. The first piezoelement 11 is centered on the axis 28 and secured so it does not rotate relative to the housing 20. For example, the first piezoelement 11 can be secured to the structure of housing 20. The second piezoelement 12 is also centered on the axis 28. As shown in FIG. 1, the second piezoelement 12 is mounted on the annular flange 21 which is formed on shaft 17. The annular flange 21 extends from shaft 17 in a radial direction, transverse to the axis 28. The second piezoelement 12 is fixed to the annular flange 21, and the annular flange is securely attached to the shaft 17. Consequently, the shaft 17 and the second piezoelement will always rotate together.

First and second piezoelements 11, 12 are provided with a plurality of pushers 38, 40 which extend away from a perimeter of first and second piezoelements 11, 12 at a periphery thereof. The details regarding the operation of the pushers will be explained in further detail as the discussion progresses. Briefly, however, the pushers 38, 40 will frictionally engage an interior surface of the rotor 15.

The first piezoelement 11, pushers 38 and rotor 15 together comprise a first piezomotor drive unit. Second piezoelement 12, pushers 40 and rotor 15 together comprise a second piezomotor drive unit. In FIG. 1, certain details relating to the first and second piezomotor drive unit have been omitted for greater clarity. A more complete explanation of the first and second piezomotor drive units is provided in relation to FIGS. 5 and 6.

The operation of the motor 10 will now be described. When first piezoelement 11 is stimulated with an exciter voltage, a mechanical oscillation results in the piezoelement. The mechanical oscillation, combined with the motion of the pushers 38, applies a rotational force which will cause the first piezoelement 11 to rotate relative to the rotor 15. Since the piezoelement 11 is fixed in position and cannot rotate within the housing 20, the rotational force will cause the rotor 15 to rotate relative to the piezoelement. Further, due to the arrangement of the pushers 38, the rotational force exerted by the first piezoelement on the rotor 15 will cause the rotor 15 to rotate in a "forward" direction relative to housing 20. For the purposes of this description, the forward direction of rotation in FIG. 1 shall be understood to mean that the top of the rotor 15 is moving in a direction into the page. However, it should be understood that this direction is not critical and the invention is not limited in this regard. As a result of the action of pushers 38, the rotor 15 will rotate in the forward direction at an angular rate (relative to the housing 20) that shall be referred to as a first forward rate of rotation.

Referring again to FIG. 1, the second piezoelement 12 is also stimulated with an exciter voltage, which causes a mechanical oscillation of the piezoelement. The mechanical oscillation of the second piezoelement, combined with the motion of the pushers 40, applies a rotational force which tends to urge the second piezoelement 12 to rotate relative to the rotor 15. Due to the arrangement of the pushers 40, the rotational force exerted by the second piezoelement 12 on the rotor 15 will cause the piezoelement 12 to rotate in the forward direction relative to housing 20. This means that in FIG. 1, the top of the piezoelement 12 is moving in a direction into the page and is rotating in the same direction as the rotor 15. The piezoelement 12 is attached to the shaft 17 through flange 21. Accordingly, the rotation of the piezoelement 12 will also cause shaft 17 to rotate in the forward direction as defined above.

Significantly, the rotation of the shaft 17 will be at a second forward rate of rotation that is different from the first forward rate of rotation experienced by the rotor 15. More particularly, the rate of rotation for the shaft 17 will be greater than the rate of rotation of the rotor 15. For example, if the first and second piezoelements in FIG. 1 are substantially identical and are excited at the same frequency, then the second forward rate of rotation will be approximately twice the first forward rate of rotation. A schematic diagram illustrating such an arrangement in shown in FIG. 2, where both the first and second piezoelement are excited with a common exciter voltage $v_1(t)$. Still, the invention is not limited in this regard. If the first and second piezoelements are excited at different frequencies, the second forward rate of rotation can have a different mathematical ratio relative to the first forward rate of rotation.

The ratio of the first and second forward rates can also be modified by other means. For example, in FIG. 1, the inner diameter of the rotor 15 is shown to be the same in those areas where the rotor 15 engages pushers 38 and pushers 40. However, the ratio of the first and second forward rate can also be modified by varying the size of the diameter for the first or second piezoelement and the diameter of the inner surface of rotor 15 where it engages pushers 38, 40, respectively. Notably, the motor in FIG. 1 also provides an increase in torque at shaft 17 due to the combined torque forces supplied by the first and second piezoelements.

Figure 3:
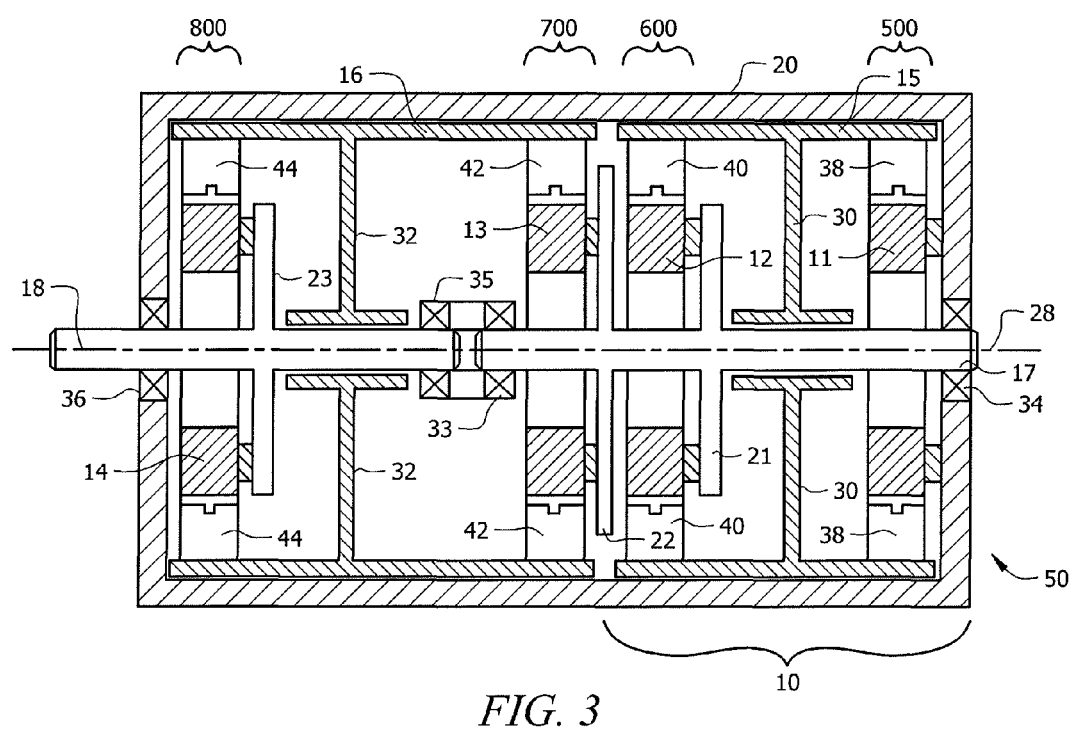
FIG. 3 is a cross-sectional view of a bi-directional high speed piezoelectric rotary motor 10 that is useful for understanding the invention.
Figure 4:
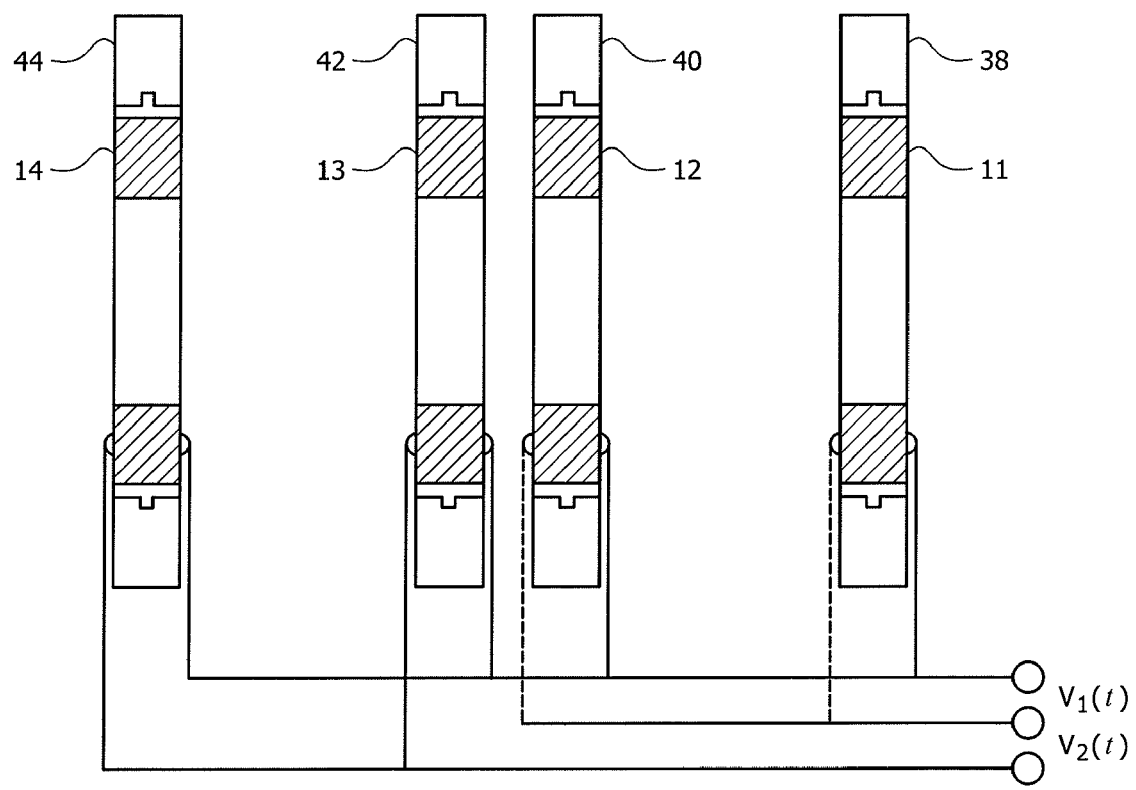
FIG. 4 is a schematic drawing that shows a basic electrical arrangement for excitation of the motor in FIG. 3.

The motor shown in FIG. 1 can also be used to form a bi-directional high speed motor. FIG. 3 is a cross-sectional view of such a high speed bi-directional piezoelectric rotary motor 50 that is useful for understanding the invention. FIG. 4 illustrates the basic electrical arrangement for excitation of the motor in FIG. 3.

Referring now to FIG. 3, the motor 50 is comprised of a housing 20 having a defined motor axis 28. A first shaft 17 is provided aligned with the motor axis and rotatably mounted to the housing 20 on bearings 33, 34. A second shaft 18, which is separate from the first shaft, is also provided. The second shaft 18 is also aligned with the motor axis and is similarly mounted for rotation relative to the housing. The second shaft is mounted in bearings 35, 36. A first rotor 15 is disposed circumferentially about the first shaft 17 along a portion of the length of the first shaft 17. A second rotor 16, which is separate from the first rotor 15, is disposed circumferentially about at least a portion of the length of both the first and second shafts 17, 18.

Notably, each of the first rotor 15 and the second rotor 16 is configured for rotation about at least one of the first and second shaft 17, 18. First rotor 15 is configured to rotate around portions of shaft 17. Second rotor 16 is configured to rotate around portions of both the first shaft 17 and the second shaft 18. In FIG. 3, mechanical support for this rotation is accomplished by means of annular support members 30 and 32 which are rotatably journaled on first shaft 17 and second shaft 18, respectively. Still, the invention is not limited in this regard. For example, the rotors 15 and 16 could also rotate in bearings disposed between the housing 20 and the outer surface of the rotor 15, 16.

The motor 50 is further comprised of four annular shaped piezoelectric oscillators which shall be referred to herein simply as piezoelements. The piezoelements include a first piezoelement 11, second piezoelement 12, third piezoelement 13 and fourth piezoelement 14. The first piezoelement 11 is centered on the axis 28 and secured so it does not rotate relative to the housing 20. For example, the first piezoelement 11 can be secured to the structure of housing 20.

The second and third piezoelements 12 and 13 are also centered on the axis 28. As shown in FIG. 3, the second and third piezoelements 12, 13 are respectively mounted in a fixed position on annular flanges 21 and 22 which are formed on shaft 17. The annular flanges 21, 22 extend from shaft 17 in a radial direction, transverse to the axis 28. The annular flanges 21, 22 are securely attached to the shaft 17 and will therefore rotate when shaft 17 is rotated.

The fourth piezoelement 14 is also centered on the axis 28. The fourth piezoelement 14 is fixed on annular flange 23 such that the fourth piezoelement cannot rotate relative to the annular flange. The annular flange 23 extends from shaft 18 in a radial direction, transverse to the axis 28. The annular flange 23 is securely fixed to the shaft 18 and therefore cannot rotate relative to shaft 18. In other words, the shaft 18 will rotate together with fourth piezoelement 14.

First and second piezoelements 11, 12 are provided with a plurality of pushers 38, 40 which extend away from a perimeter of first and second piezoelements 11, 12 at a periphery thereof. The details regarding the operation of the pushers will be explained in further detail as the discussion progresses. Briefly, however, the pushers 38, 40 will frictionally engage an interior surface of the rotor 15. Similarly, third and fourth piezoelements 13, 14 are provided with a plurality of pushers 42, 44 which extend away from a perimeter of piezoelements 13, 14 at a periphery thereof. The pushers 42, 44 will frictionally engage an interior surface of the rotor 16.

The first piezoelement 11, pushers 38 and rotor 15 together comprise a first piezomotor drive unit. Second piezoelement 12, pushers 40 and rotor 15 together comprise a second piezomotor drive unit. Third piezoelement 13, pushers 42, and rotor 16 together comprise a third piezomotor drive unit. Fourth piezoelement 14, pushers 44, and rotor 16 together comprise a fourth piezomotor drive unit. In FIG. 3, certain details relating to the first, second, third and fourth piezomotor drive unit have been omitted for greater clarity. A more complete explanation of the first and second piezomotor drive units is provided in relation to FIGS. 5 and 6.

It can be observed that motor 50 in FIG. 4 incorporates the features of motor 10 described above. Those features of motor 10 described above in relation to motor 10 operate in motor 50 in substantially the same way as previously described. Accordingly, the operation of that portion of motor 50 will not be repeated here. Instead, it is sufficient to note that shaft 17 will rotate in a forward direction as defined above when piezoelements 11 and 12 are each stimulated with an appropriate exciter voltage. Further it may be recalled that shaft 17 will rotate at a second forward rate which is greater than a first forward rate of rotor 15.

A description of the operation of the remaining features of motor 50 will now be provided. When third and fourth piezoelements 13 and 14 are not stimulated with a respective exciter voltage, the pushers 42, 44 will frictionally engage an interior surface of the rotor 16. Consequently, the shaft 18 will be forced to rotate with shaft 17. More particularly, pushers 42 will frictionally engage the interior surface of rotor 16 so as to prevent rotor 16 from rotating relative to shaft 17. In other words, the rotation of rotor 16 will be locked to the rotation of shaft 17. Further, when the fourth piezoelement is not excited, the pushers 44 will frictionally engage the interior surface of the rotor 16. This action will essentially lock shaft 18 to rotor 16 such that rotation of rotor 16 necessarily results in rotation of shaft 18. The net result of these operations is that the second forward rate rotation from shaft 17 will be communicated to shaft 18 when the first and second piezoelements are excited. In this embodiment shaft 18 is effectively the output shaft of the motor 50.

As previously noted, motor 50 is a bi-directional motor. The foregoing discussion is directed generally to the forward direction motor operation. Accordingly, the operation of the motor in the reverse direction (opposite forward direction) will now be explained.

When motor 50 is operated in a reverse direction of rotation, the third and fourth piezoelements 13, 14 are stimulated with an exciter voltage and the first and second 11, 12 piezoelements are not stimulated. Due to the fact that the first piezoelement is not excited, pushers 38 will frictionally engage the inner surface of rotor 15. However, pushers 38 are attached to piezoelement 11, which is secured in a fixed position relative to housing 20. Consequently, the rotor 15 will be locked to the housing and prevented from rotating. Similarly, because the second piezoelement 12 is not excited, pushers 40 will frictionally engage the inner surface of rotor 15. Since the second piezoelement 12 is fixed on flange 21, the engagement of pushers 40 with rotor 15 will result in shaft 17 being locked to rotor 15. Accordingly, shaft 17 is unable to rotate.

With shaft 17 locked as described above, third piezoelement 13 will also be locked so that it is prevented from rotating relative to housing 20. When the third piezoelement 13 is stimulated, a mechanical oscillation results in the piezoelement. The mechanical oscillation, combined with the motion of the pushers 42, applies a rotational force which will cause rotation of the third piezoelement 13 relative to rotor 16. Since the third piezoelement 13 is unable to rotate within the housing 20, the rotational force of pushers 42 will cause the rotor 16 to rotate relative to the housing 20. Further, due to the arrangement of the pushers 42, the rotational force exerted by the third piezoelement 13 on the rotor 16 will cause the rotor 16 to rotate in a "reverse" direction relative to housing 20. For the purposes of this description, the reverse direction of rotation in FIG. 3 shall be understood to mean that the top of the rotor 16 is moving in a direction out of the page. However, it should be understood that this direction is not critical and the invention is not limited in this regard. As a result of the action of pushers 42, the rotor 16 will rotate in the reverse direction at an angular rate (relative to the housing 20) that shall be referred to as a first reverse rate of rotation.

Referring again to FIG. 3, the fourth piezoelement 14 is also stimulated with an exciter voltage, which causes a mechanical oscillation of the piezoelement. The mechanical oscillation of the fourth piezoelement, combined with the motion of the pushers 44, applies a rotational force which tends to urge the fourth piezoelement 14 to rotate relative to the rotor 16. Due to the arrangement of the pushers 44, the rotational force exerted by the fourth piezoelement 14 on the rotor 16 will cause the fourth piezoelement 14 to rotate in the reverse direction relative to housing 20. This means that in FIG. 3, the top of the piezoelement 14 is moving in a direction out of the page and is rotating in the same direction as the rotor 16. The piezoelement 14 is attached to the shaft 18 through flange 23. Accordingly, the rotation of the piezoelement 14 will also cause shaft 18 to rotate in the reverse direction as defined above.

Significantly, the rotation of the shaft 18 will be at a second reverse rate of rotation that is different from the first reverse rate of rotation experienced by the rotor 16. More particularly, the rate of rotation for the shaft 18 will be greater than the rate of rotation of the rotor 16. For example, if the third and fourth piezoelements in FIG. 3 are substantially identical and are excited at the same frequency, then the second reverse rate of rotation will be approximately twice the first reverse rate of rotation. A schematic diagram illustrating such an arrangement in shown in FIG. 4, where both the third and fourth piezoelement 13, 14 are excited with a common exciter voltage $v_2(t)$. Still, the invention is not limited in this regard. If the third and fourth piezoelements are excited at different frequencies, the second reverse rate of rotation can have a different mathematical ratio relative to the first reverse rate of rotation.

The ratio of the first and second reverse rates can also be modified by other means. For example, in FIG. 3, the inner diameter of the rotor 16 is shown to be the same in those areas where the rotor 16 engages pushers 42 and pushers 44. However, the ratio of the first and second reverse rate can also be modified by varying the size of the diameter for the third or fourth piezoelement and the diameter of the inner surface of rotor 16 where it engages pushers 42, 44 respectively. Notably, the motor in FIG. 3 also provides an increase in torque at shaft 18 due to the combined torque forces supplied by the third and fourth piezoelements.

In FIGS. 1 and 3, first piezoelement 11, pushers 38 and rotor 15 together comprise a first piezomotor drive unit 500. Second piezoelement 12, pushers 40 and rotor 15 together comprise a second piezomotor drive unit 600. Third piezoelement 13, pushers 42, and rotor 16 together comprise a third piezomotor drive unit 700. Fourth piezoelement 14, pushers 44, and rotor 16 together comprise a fourth piezomotor drive unit 800. From the foregoing, it should be understood that the phrase "piezomotor drive unit" is intended to refer to those elements of a piezoelectric motor design which are the source of the motive force for causing rotary movement of an output drive shaft. In contrast, the phrase "piezoelectric motor" is a more general term and is intended to refer to the overall motor system. As such, the phrase "piezoelectric motor" as used herein can include one or more piezomotor drive units, and additional structure such as a motor housing, bearings, transmission elements, output shafts and so on.

In some embodiments of the present invention, the design details of the piezomotor drive unit are not critical. Various existing designs are known in the art with regard to rotary type piezomotor drive units and any such piezomotor drive unit can be used with the present invention. As such, the first, second, third and fourth piezomotor drive units can, in some embodiments of the invention, be consistent with conventional piezoelectric rotary motor designs that are known in the art.

For example, U.S. Pat. No. 7,405,508 to Petrenko discloses a rotary piezoelectric drive unit which can be used in the present invention. The drive unit operates on the basis of radial oscillations and includes an annular piezoelements in the form of ring-shaped resonators. The external cylindrical surfaces of the piezoelements are embraced by wave shells on which pushers are provided. The pushers are mounted in the wave shell and press against the inner surface of a rotor. The radial oscillations of the piezoelements operate on the pushers to engage the rotor and thereby perform micro-displacement of the rotor. The disclosure of U.S. Pat. No. 7,405,508 is incorporated herein by reference.

It can also be desirable in some embodiments of the present invention to provide a piezomotor drive unit with increased speed and increased torque. Accordingly, embodiments of the present invention can also include a rotary piezomotor drive unit with high torque, similar to that described in U.S. patent Ser. No. 12/639,232 to Petrenko filed Dec. 16, 2009, the disclosure of which is incorporated herein by reference. The features of such high torque piezomotor drive unit will now be described herein in greater detail.

A rotary piezomotor drive unit can include a ring-shaped or annular piezoelement. In general, the frequency of the radial mode of a ring-shaped resonator $F_r^R$ is described by the equation:

$$F_r^R = \frac{1}{ad\pi}\sqrt{\frac{n^2+1}{\rho * s_{jk}}} \quad (1)$$

where d is an average diameter of the ring (in particular the diameter of the piezoelectric ring), $s_{jk}$ is the coefficient of elasticity of the material (in particular the material of the piezoelectric ring), a is the form factor of the ring (in particular the form factor of the piezoelectric ring) which is determined experimentally, $\rho$ is density of the material (in particular, density of the piezoelectric ring), and n is an integer $\geq 0$ and specifying the order of the vibrational mode. In the case of the zero order radial vibrational mode (1) can be transformed into the equation:

$$F_r^R = c_p/2\times\pi[(R_p+r_p)/2], \quad (2)$$

where $c_p$ is the speed of propagation of sound waves in the material, $R_p$ is the outside radius of the annular piezoelement, and $r_p$ is the inner radius of the annular piezoelement.

Conventional piezomotor drive unit designs including annular piezoelectric elements do not practically allow an increase in the torque of the motor beyond certain limits. In general, the increase in the torque of the piezomotor drive unit is usually associated with an increase in the diameter of the rotor and, as a consequence, torque is usually increased via an increase in the diameter of the ring-shaped resonator. However, a significant disadvantage with this approach is that, as the diameter of the annular piezoelement is increased, the frequency of its zero-order radial vibrational mode drops into the high-frequency end of the audible sound band. For example, for a conventional piezoelectric motor including an annular piezoelement with parameters $R_p$=35 mm, $r_p$=20 mm, and $c_p$=3500 m/s, the frequency of the zero-order mode of radial vibration is approximately 20,000 Hz. This frequency is at the boundary of the acoustic and ultrasonic frequencies. Any further increase in diameter of the annular piezoelement shifts the excitation frequency into the audible sound range that generally results in nuisance acoustic effects as far as users are concerned. Accordingly, increasing torque by simply increasing the diameter of the piezoelement is not generally desirable.

In conventional piezomotor drive units, the decrease in frequency is typically compensated for by reducing the internal radius of the annular piezoelement, thus increasing the annular width of the annular piezoelement. The term "annular width" as used herein, refers to the difference between the inner and outer radiuses of an annular piezoelement. This will lead to an increase in the excitation frequency according to equation (2), but in this case the system operates as a thick ring resonator (a thick ring here is defined by the annular width of the annular piezoelement) and the Q factor decreases rapidly. A similar situation arises when higher order radial excitation modes are used. In such instances, the Q factor of the annular piezoelement also decreases rapidly and the motor becomes less efficient.

Embodiments of the present invention therefore can include a design for a rotary piezomotor drive unit with high torque. The high torque piezomotor drive unit has a virtually instantaneous start (it reaches maximum torque within a few milliseconds), a high starting torque (at least 5 Nm), an overdrive-free design due to its inherent non-electromagnetic design, a high deceleration torque, and an enhanced operational capacity. Such a piezomotor drive unit is similar to conventional piezomotor drive units to the extent that it is based on an annular piezoelement design. However, it differs from conventional piezomotor drive units because it uses an operating excitation frequency which excites the first order longitudinal vibrational mode across the width of the annular piezoelement. In contrast, conventional piezomotor drive units are normally configured to be excited using the zero order radial mode. These and other features of the piezomotor drive unit will now be described in further detail.

Figure 5:
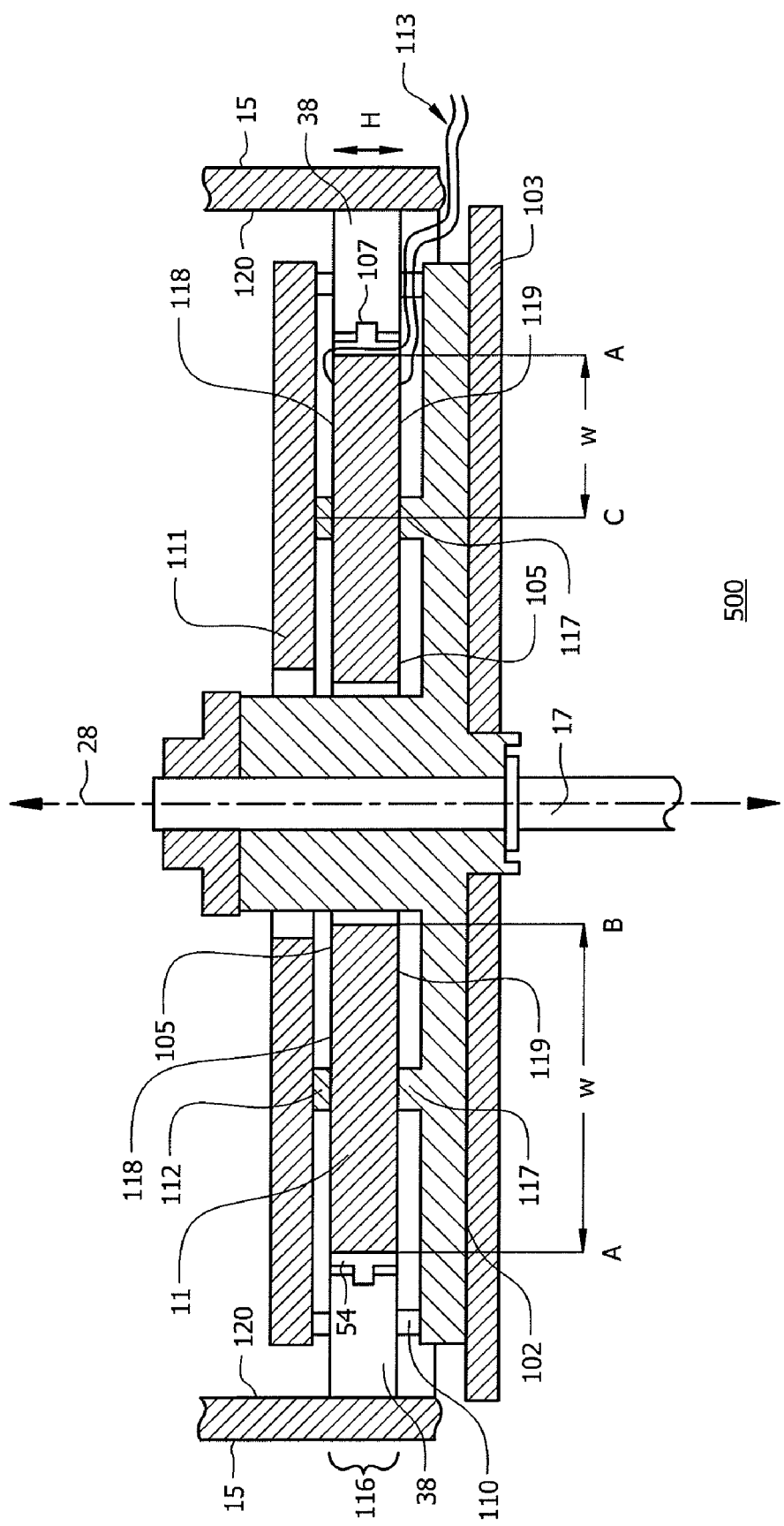
FIG. 5 is a cross-section side view of an exemplary piezomotor drive unit that is useful for understanding one embodiment of the present invention.
Figure 6:
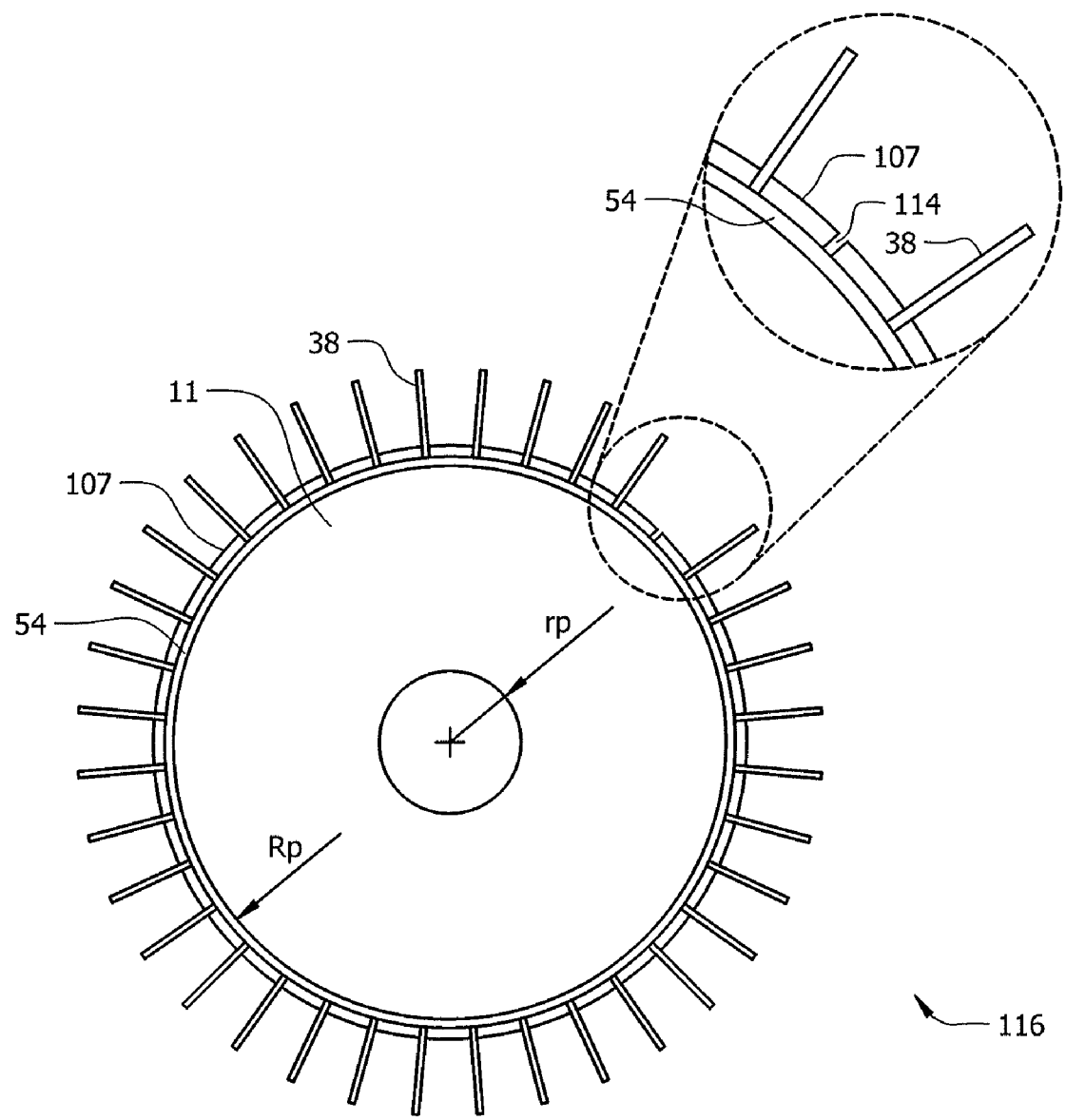
FIG. 6 is a top view of a subassembly of FIG. 5 including a piezoelement, a wave shell, and pushers.

An exemplary embodiment of the new piezomotor drive unit will be described with respect to FIGS. 5 and 6. FIG. 5 is a cross-section side view of an exemplary piezomotor drive unit 500 configured in accordance with an embodiment of the present invention. FIG. 6 is a top view of a subassembly 116 of FIG. 5 including a piezoelement 11, a wave shell 54, and pushers 108.

The piezomotor drive unit 500 includes annular piezoelement 11, cylindrical rotor 15, shaft 17, and pushers 38 as previously described in relation to FIGS. 1 and 2. The piezoelement 11, cylindrical rotor 15 and shaft 17 are centrally aligned with motor axis 28 as previously described. In FIG. 5, additional structural details are provided relating to the piezomotor drive unit 500. However, for greater clarity, only a portion of rotor 15 is shown.

The piezomotor drive unit 500 can include an stator base 103, mechanically fixed to the stator 102. Each of the stator base 103 and stator 102 can have an annular shape. The stator base 103 can be attached to a motor housing 20 (not shown in FIG. 5) so that the piezoelement 11 is oriented as shown in FIGS. 1 and 3. Alternatively, the stator base 103 can be integrally formed with the motor housing 20. The stator base 103, the stator 102 and the piezoelement 11 are fixed relative to the motor housing 20. Consequently, the stator base 103, stator 102 and annular piezoelement 11 do not rotate relative to the housing 20. In contrast, rotor 15 is mounted within the housing 20 such that it can rotate relative to stator base 103, stator 102 and piezoelement 11.

A subassembly 116 can be mounted on stator 102. The rotor 15 and the subassembly 116 can be mounted perpendicular to and about the motor axis 28 so as to allow rotor 15 to rotate about axis 28.

Piezoelement 11 has flat electrodes 105 and is polarized normal to the surface area of the electrodes. Electrodes 105 can be annularly formed on the upper and lower surfaces 118, 119 of the piezoelement 11. Electrical conductor leads 113 can be electrically coupled to the electrodes 105 provided on annular piezoelement 11. The subassembly 116 can further include an ring-shaped wave shell 54, with T-cross-section including a reinforcing rib 107, surrounding the annular piezoelement 11. That is, the wave shell 54 is attached to an outer rim of the piezoelement. The wave shell 54 can be an elastic or deformable material, such as a metal or plastic. The subassembly 116 further includes a series of thin plate pushers 38 attached to the wave shell 54. The pushers 38 provide friction contact with the cylindrical inner surface 120 of the rotor 15. In some embodiments of the invention, the pushers 38 can be grouped. For example, they can be assembled in packs of 2, 3, 4, etc.

For convenience, pushers 38 are shown in FIG. 6 as linear elements projecting from the piezoelement 11 in a radial direction. However, those skilled in the art will appreciate that pushers 38 can have a somewhat arcuate shape. Similarly, those skilled in the art will appreciate that the pushers 38 can be project from the piezoelement 11 in a direction that forms some angle relative to the radial direction. It should be appreciated that the particular arcuate shape or projection angle of the pushers can define the direction of rotation associated with piezomotor drive unit 500.

The annular piezoelement 11, when excited, acts as a ring-shaped resonator with longitudinal modes of vibration set up across its width (w) as shown in FIGS. 7A-7C. The wave shell 54 is elastic in its radial direction so that the vibrations of the piezoelement 11 are conducted to the rotor 15 via the pushers 38 on the outer surface of the wave shell 54. The piezoelement 11 is polarized normal to its flat end faces to which electrodes 113 (which supply the excitation voltages) are fixed.

In the various embodiments of the present invention, piezomotor drive units with increased torque are provided by improving the motor design parameters and at the same time eliminating the undesirable effects of any decrease in the Q factor. This is achieved by increasing the diameters of the rotor 15 and the piezoelectric ring-shaped resonator 11, while switching to a different excitation frequency, which excites the first order longitudinal vibrational mode across the annular width of the annular piezoelement 11. That is, the operating frequency of the applied voltage is selected to excite the first-order longitudinal mode of vibration radially across the annular width of the piezoelement 11. In particular, the operating frequency $F_r^R$ for the excitation voltage can be described by the equation:

$$F_r^P = c_p/2w, \qquad (3)$$

where $c_p$ is the speed of propagation of the sound waves in the annular piezoelement material and w is the annular width of the annular piezoelement ($w=R_p-r_p$).

Increased efficiency in performance at the new vibrational mode is further achieved by the combination of two factors: (1) the use of the first order vibrational mode for excitation of the piezoelement 11, and (2) the use of a wave shell 54 formed as a thin-walled cylinder with T-shaped cross-section providing a ring-shaped reinforcing rib 107, as shown in FIGS. 5 and 6. The rib 107 serves as a mechanical amplifier (concentrator) of acoustic energy. That is, since the mass of the rib 107 is relatively small as compared to the mass of other portions of the wave shell 54 and the mass of the piezoelement 11, the acoustic energy generated by the vibrations of the piezoelement 11 and the wave shell is concentrated at the rib 107. The acoustic energy at the rib 107 is transferred to the pushers 38 to contact the inner surface 120 of the rotor 15 and subsequently cause motion of the rotor 15 due to friction forces between the pushers 38 and the inner surface 120 of the rotor 15 during operation of the piezomotor drive unit 500.

The pushers are mounted in slots 114 cut into the rib 107 at intervals around its circumference. The pushers 38 can be formed as either single plates or as small packs of plates in each of the slots 114. Each plate or stack of plates bears against the inner surface 120 of rotor 15. In embodiments where the pushers 38 are grouped into packs, the friction force between the pushers 38 and the inner surface 120 of the rotor 15 is increased, increasing torque of the motor 500.

In the various embodiments of the present invention, excitation of the first order vibrational longitudinal mode can be achieved by configuring the piezoelement 11 to have an outer radius ($R_p$) that is at least twice the inner radius ($r_p$) (i.e., $R_p>2r_p$) and an annular width (w) that is at least twice a thickness of the piezoelectric element (i.e. w>2H). Therefore, when excited using an alternating voltage having a frequency ($F_r^P$) equal to $c_p/2(R_p-r_p)$, the wave shell 54 is operable to efficiently transfer oscillations of the piezoelement 11 in the radial direction. The pushers 38 effect rotary movement of the rotor 15 about the axis 28 with a significantly higher amount of torque than observed in conventional piezomotor drive units including annular piezoelements. Furthermore, the piezoelement 11 can be polarized normal to its flat end surfaces and the electrodes 113 can be affixed to these flat end surfaces. For example, as shown in FIG. 5, electrodes 105 are coupled to the flat upper 118 and lower 119 surfaces of the annular piezoelement 11.

Accordingly, based on the relationships $R_p>2r_p$ and w>2H for the piezoelement 11 and the piezoelectric material (which specifies $c_p$), dimensions for the annular piezoelement 11 for a particular excitation voltage frequency can be selected. For example, in embodiments where the piezoelement 11 is constructed from piezoceramics selected from the group of piezoelectric lead-zirconate-titanate-strontium ceramics (PZT) materials, the first order vibrational longitudinal mode across the width of the ring shell begins to form effectively when $R_p>20$ mm, $r_p>8$ mm, and thickness H=5-10 mm. However, the present invention is not limited to the use of PZT materials. In other embodiments of the present invention, other types of piezoelectric materials can be used.

As described above, the wave shell 54 can be formed as a thin-walled cylinder with T-shaped cross-section and ring-shaped reinforcing rib 107 with high stiffness along the periphery, which serves as a mechanical amplifier of acoustic energy. Furthermore, the reinforcing rib 107, as previously described, can have periodically spaced slots 114, in which pushers 38, formed as thin plates, are fixed with the opposite end of the pushers 38 pressed against the inner surface 120 of the rotor 15. In some embodiments, the pushers 38 secured in the slots 114 can have no direct acoustic contact (i.e., no rigid connection between the wave shell 54 and the pushers 38) with the thin-walled cylinder of the wave shell 54.

In the various embodiments of the present invention, mounting or holding of the annular piezoelement 11 in the piezomotor drive unit 500 can be accomplished by using a pressure flange 111 acting through an elastic ring grommet or gasket 112. In general, when a mechanical component is placed in physical contact with a piezoelement, the Q factor is decreased due to dampening of vibration in the piezoelement. Therefore, in the various embodiments of the present invention, the configuration of the gasket 112 can be selected such that significant degradation in Q factor is limited. In particular, the gasket 112 can be configured to contact the annular piezoelement 11 in an area of minimum vibration speed. For example, as shown in FIG. 5, the annular piezoelement 11 can be contacted by the pressure flange 111 and gasket 112 at the mean between the inner and outer rims of the annular piezoelement 11. Furthermore, as the maximum mechanical tension generally occurs in the median area of the ring-shaped resonator (i.e., where the minimum in the vibrational speed arises), the gasket 112, which is acoustically coupled to the annular piezoelement 11, can also configured to withstand this mechanical tension. In general, a rubber or other elastomeric washer can be selected because it generally does not affect any parameters associated with the initial deformation in thickness of the piezoelement.

The stator 102 can include mounting features 117 for supporting the subassembly 116. The mounting features 117 can contact the annular piezoelement 11 at a point that is at the mean of the inner and outer radii (or rims) of the annular piezoelement 11, as described above and below, to minimize interference with the expansion and contraction of the annular piezoelement 11. The stator 102 and piezoelement 11 are in a fixed arrangement such that they cannot rotate with respect to stator base 103.

In FIG. 5, shaft 17 is centrally positioned within an axial bore defined within stator 102, and aligned with axis 28. As previously explained in relation to FIGS. 1 and 3, the shaft 17 can rotate within the motor housing 20. Similarly, the rotor 15 can be mechanically and rotatably coupled to shaft 17 as described in relation to FIGS. 1 and 3.

A pressure flange 111 can be provided for providing mechanical pressure to the annular piezoelement 11 to hold it in place within piezomotor drive unit 500. In some embodiments, tubular elements 110 are provided for mounting the pressure flange 111. The tubular elements can extend between the pressure flange 111 and the stator 102. Screws or other suitable fasters can engage with threads formed in opposing ends of the tubular elements to secure the tubular element to the pressure flange 111 and the stator 102, thus applying pressure on piezoelement 11 by gaskets 112. Furthermore, a ring grommet or gasket 112, such as a rubber or other elastomeric ring, can be provided between the flange 111 and the piezoelement 11, as described above.

Operation of the piezomotor drive unit 500 is described with respect to excitation of the piezoelement 11, as shown in FIGS. 7A-7C. FIG. 7A is a cross-section side view of the piezoelement 11 in FIG. 5 in an unexcited state. FIG. 7B is a cross-section side view of the piezoelectric element in FIG. 5 in an excited state resulting in radial expansion. FIG. 7C is a cross-section side view of the piezoelement 11 in FIG. 5 in an excited state resulting in radial compression.

In FIGS. 7A-7C, the piezoelement 11 has dimensions $R_p$ and $r_p$ so that an excitation voltage with frequency $F_r^P$ corresponds to the frequency of the first longitudinal mode across the annular width (w) of the annular piezoelement 11. Prior to applying the excitation voltage the annular width w of the piezoelement 11 is unchanged, as shown in FIG. 7A. Once the excitation voltage is applied to contacts 113, deformation begins. As shown in FIG. 7B, a lateral deformation (−ΔH) can occur along the thickness (H) of the annular piezoelement 11. As a result of this initial lateral deformation and due to the elastic forces, at least some secondary deformation along the width of the annular piezoelement 11 is formed. This is transformed into a longitudinal standing wave radial deformation with maximum amplitude of the vibrations at the positions of the outer rim A and inner rim B of the annular piezoelement 11, and minimum amplitude of the vibrations at the midpoint between A and B, point C. (Point C defines at the median diameter of the ring, and determines the attachment points of the piezoelement resonator 11 to the stator 102, as described above.) The radial expansion of the piezoelement causes an increase in the annular width w, and this results in rims A and B moving in radially opposite directions by amounts $\Delta w_1$ and $\Delta w_2$, respectively, as shown in FIG. 7B. As a result, the pushers 38 are pressed against the inner surface 120 of the rotor. In many cases, the rims A and B move symmetrically. That is, $\Delta w_1 = \Delta w_2$. However, in some cases, due to variations in the piezomotor drive unit 500, $\Delta w_1 \ne \Delta w_2$. However, generally $\Delta w_1$ and $\Delta w_2$ will be within 5% to 10% of each other.

As the alternating excitation voltage is further applied to the piezoelement 11, compression of the width of the annular piezoelement 11 can subsequently occur, as shown in FIG. 7C. In contrast to FIG. 7B, the radial compression, which is symmetrical in respect to the medium radius point C, causes the annular width w to decrease. The radial compression of the piezoelement causes a decrease in the annular width h, and this results in rims A and B moving in radially opposite directions by amounts $-\Delta w_3$ and $-\Delta w_4$, respectively, as shown in FIG. 7C. As a result, the pushers 38 are pulled away from the inner surface 120 of the rotor. In many cases, the rims A and B move symmetrically. That is, $-\Delta w_3 = -\Delta w_4$. However, in some cases, due to variations in the piezomotor drive unit 500, $-\Delta w_3 \ne -\Delta w_4$. However, $-\Delta w_3$ and $-\Delta w_4$ will generally be within 5% to 10% of each other. Furthermore, in many cases, the symmetrical motion results in $|-\Delta w_3| = |-\Delta w_4|$, $= \Delta w_1 = \Delta w_2$. However, due to variations in the piezomotor drive unit 500, at least one of $|-\Delta w_3|$, $|-\Delta w_4|$, $\Delta w_1$, and $\Delta w_2$ can be different. As a result of the radial compression of piezoelement 11, the pushers 38 are pulled away from the inner surface 120 of the rotor.

In operation, piezomotor drive unit 500 works as described below. Initially, an alternating voltage with a frequency $F_r^P$, corresponding to the frequency of the first longitudinal mode across the annular width (w) of the piezoelement 11, is applied to contacts 113. In response to this voltage, a lateral deformation along the thickness (H) of the ring is formed initially, as described above with respect to FIG. 7. As a result of this initial lateral deformation and due to the elastic forces, a secondary deformation along the annular width (w) of the piezoelement 11 occurs, which is transformed into a longitudinal standing wave deformation with maximum amplitude of the vibrations at the outer A and inner B rims of the piezoelement 11 and minimum amplitude of the vibration at the medium radius point C. The vibrations cause stretching and compression of the piezoelement 5 along its annular width (w), resulting in displacement of at least the outer rim A, as described above with respect to FIG. 3.

Since the outer rim A of the annular piezoelement 11 is closely fitted within the wave shell 54, the displacement (i.e., vibrations) of the outer rim A is transferred to the wave shell 54 and the vibrations are amplified by the reinforcing rib 107 because of the mass differences, as described above. The amplified vibrations then are transferred via the pushers 38 to the rotor, which then rotates. When vibrating, the pushers 38 are not acoustically coupled with the cylindrical portion of the wave shell 54. This is because of the differences in the masses of the cylindrical portion of the wave shell 54 and the reinforced rib 107, which results in a greater vibrational velocity at the rib 107 and therefore at the pushers 38.

The frictional interaction of pushers 38 with a rotor 15 is described in detail in U.S. Pat. No. 7,405,508 which has been incorporated herein by reference. Accordingly, the operation of the pushers will not be described here in detail. Briefly, however, the mechanical oscillation of the piezoelement 11 results in the pushers 38 first being pushed radially outwardly and then being drawn radially inwardly in a repetitive motion. However, due to the resilient nature of the pushers 38 interacting with the inner surface 120 of rotor 15, the ends of the pushers that engage inner surface 120 will move in an elliptical path as they engage and then disengage the inner surface. The frictional interaction of the pushers 38 with the inner surface 120 provides the motive force which causes the rotor 15 to rotate about the fixed piezoelement 15.

Notably, when piezoelement 11 is not stimulated with an electrical exciter signal, the pushers 28 will remain in contact with the inner surface 120 of rotor 15. In this regard, the pushers 28 will frictionally engage inner surface 120. Such frictional engagement will effectively prevent the rotor 15 from rotating relative to the fixed piezoelement 11. Moreover, since the piezoelement is mounted in a fixed position within the housing 20, the rotor 15 will be unable to rotate relative to the housing 20 and is thereby effectively locked to the piezoelement.

In FIGS. 1 and 3, the second piezomotor drive unit 600 (consisting of piezoelement 12, pushers 40, and rotor 15) can have a design similar to piezomotor drive unit 500 described above in relation to FIGS. 5-7. However, the stator base 103 would be secured to the flange 21 in FIG. 1, instead of being attached to the housing 20. More particularly, the stator base 103 would be secured to flange 21 such that the stator base 103 cannot rotate relative to flange 21 or shaft 17. For example, in some embodiments, the stator base 103 can be integrally formed with the flange 21.

Similarly, the third piezomotor drive unit 700 can have a design similar to piezomotor drive unit 500 described above in relation to FIGS. 5-7. However, in the case of the third piezomotor drive unit 700, the stator base 103 would be fixedly attached to the flange 22 in FIG. 3. Consequently the stator base 103 will not be able to rotate relative to flange 22 or shaft 17. For example, in some embodiments, the stator base 103 can be integrally formed with the flange 22.

Finally, the fourth piezomotor drive unit 800 can also have a design similar to piezomotor drive unit 500 described above in relation to FIGS. 5-7. However, in the case of the fourth piezomotor drive unit 800, the stator base 103 would be fixedly attached to the flange 23 in FIG. 3. Consequently the stator base 103 will not be able to rotate relative to flange 23 or shaft 18. For example, in some embodiments, the stator base 103 can be integrally formed with the flange 23.

Applicants present certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A piezoelectric motor, comprising:
a housing extending along an axis;
a first shaft aligned with the axis and rotatably coupled to the housing;
a first rotor disposed about the first shaft and configured for rotation about the first shaft;
an annular shaped first piezoelement disposed within the first rotor, centered on the axis and fixed to the housing;
an annular shaped second piezoelement disposed with the first rotor, centered on the axis and fixed to the first shaft;
wherein the first piezoelement is coupled to a plurality of pushers configured to rotate the first rotor at a first forward rate of rotation when the first piezoelement is stimulated with a first exciter voltage, and the second piezoelement is coupled to a plurality of pushers configured to engage the first rotor and rotate the first shaft in a second forward rate of rotation different than the first forward rate of rotation when the second piezoelement is concurrently stimulated with a second exciter voltage.

2. The piezoelectric motor according to claim 1, wherein first and second exciter voltages are the same.

3. The piezoelectric motor according to claim 1, wherein the second forward rate of rotation is greater than the first forward rate of rotation.

4. The piezoelectric motor according to claim 1, wherein the second forward rate of rotation is approximately twice the first forward rate of rotation.

5. The piezoelectric motor according to claim 1, further comprising:
a second shaft separate from the first shaft aligned with the axis and rotatably coupled to the housing;
a second rotor separate from the first rotor disposed about the first and second shafts, the second rotor configured for rotation about the first and second shaft;

an annular shaped third piezoelement disposed within the second rotor, centered on the axis and fixed to the first shaft.

6. The piezoelectric motor according to claim 5, further comprising an annular shaped fourth piezoelement disposed within the second rotor, centered on the axis and fixed to the second shaft.

7. The piezoelectric motor according to claim 6, further comprising a plurality of pushers disposed on each of the third and fourth piezoelement, the pushers configured to frictionally engage the second rotor in a clutch-like engagement when the third and fourth piezoelement are not excited, whereby the first and second shaft are rotationally locked with the second rotor.

8. The piezoelectric motor according to claim 6, wherein the plurality of pushers disposed on each of the first and second piezoelement are configured to frictionally engage the first rotor in a clutch-like engagement when the first and second piezoelement are not excited, whereby the third piezoelement is prevented from rotating.

9. The piezoelectric motor according to claim 6, wherein the third piezoelement is coupled to a plurality of pushers configured to rotate the second rotor in a reverse direction opposite the forward direction when the third piezoelement is stimulated with a third exciter voltage.

10. The piezoelectric motor according to claim 9, wherein the third piezoelement is configured to rotate the second rotor at a first reverse rate of rotation, and the fourth piezoelement is coupled to a plurality of pushers configured to engage the second rotor and rotate the second shaft in the reverse direction at a second reverse rate of rotation different from the first rate of rotation when the fourth piezoelement is stimulated with a fourth exciter voltage.

11. The piezoelectric motor according to claim 10, wherein the second reverse rate of rotation is greater than the first reverse rate of rotation.

12. The piezoelectric motor according to claim 10, wherein the third and fourth exciter voltages are the same, and the second reverse rate of rotation is approximately twice the first reverse rate of rotation.

13. The piezoelectric motor according to claim 10, wherein the first, second, third and fourth exciter voltages are the same.

14. The piezoelectric motor according to claim 10, further comprising a motor control system, the motor control system configured to only apply the first and second exciter voltage to the first and second piezoelement when the motor is operated in a forward rotation mode and only apply the third and fourth exciter voltage to the third and fourth piezoelement when the motor is operated in a reverse rotation mode.

15. A piezoelectric motor, comprising:
a housing extending along an axis;
a first shaft and a second shaft separate from the first shaft, each aligned with the axis and rotatably coupled to the housing;
a first rotor disposed about the first shaft, and a second rotor separate from the first rotor disposed about the first and second shafts, each of the first rotor and the second rotor configured for rotation about at least one of the first and second shaft;
an annular shaped first piezoelement, centered on the axis and fixed to the housing;
an annular shaped second piezoelement and third piezoelement, each centered on the axis and fixed to the first shaft;
an annular shaped fourth piezoelement centered on the axis and fixed to the second shaft;
wherein the first and second piezoelement are disposed within the first rotor, configured to motivate rotation of the second shaft in a first rotation direction when stimulated with a first exciter voltage, and the third and fourth piezoelement are disposed within the second rotor, configured to motivate rotation of the second shaft in a second direction when concurrently stimulated with a second exciter voltage.

16. The piezoelectric motor according to claim 15, wherein the first piezoelement is coupled to a first plurality of pushers configured to rotate the first rotor at a first forward rate of rotation when the first piezoelement is stimulated with the first exciter voltage, and the second piezoelement is coupled to a second plurality of pushers configured to engage the first rotor and rotate the first shaft in a second forward rate of rotation different than the first forward rate of rotation when the second piezoelement is stimulated with a second exciter voltage.

17. The piezoelectric motor according to claim 16, wherein first and second exciter voltages are the same.

18. The piezoelectric motor according to claim 16, wherein the second forward rate of rotation is greater than the first forward rate of rotation.

19. The piezoelectric motor according to claim 16, wherein the second forward rate of rotation is approximately twice the first forward rate of rotation.

20. The piezoelectric motor according to claim 16, wherein the first and second plurality of pushers disposed on each of the first and second piezoelement are configured to frictionally engage the first rotor in a clutch-like engagement when the first and second piezoelement are not excited, whereby the third piezoelement is prevented from rotating.

21. The piezoelectric motor according to claim 16, further comprising a plurality of pushers disposed on each of the third and fourth piezoelement, the pushers configured to frictionally engage the second rotor in a clutch-like engagement when the third and fourth piezoelement are not excited, whereby the first and second shaft are rotationally locked with the second rotor.

22. The piezoelectric motor according to claim 16, wherein the third piezoelement is coupled to a plurality of pushers configured to rotate the second rotor in a reverse direction opposite the forward direction when the third piezoelement is stimulated with a third exciter voltage.

23. The piezoelectric motor according to claim 22, wherein the third piezoelement is configured to rotate the second rotor at a first reverse rate of rotation, and the fourth piezoelement is coupled to a plurality of pushers configured to engage the second rotor and rotate the second shaft in the reverse direction at a second reverse rate of rotation different from the first rate of rotation when the fourth piezoelement is stimulated with a fourth exciter voltage.

* * * * *